US009961950B2

(12) United States Patent
Kuddo

(10) Patent No.: US 9,961,950 B2
(45) Date of Patent: May 8, 2018

(54) WIRELESSLY CONTROLLED LED ELECTRONIC NECKTIE

(71) Applicant: Darius Kuddo, North Bethesda, MD (US)

(72) Inventor: Darius Kuddo, North Bethesda, MD (US)

(73) Assignee: Darius Kuddo, Rockville, MD (US)

( * ) Notice: Subject to any disclaimer, the term of this patent is extended or adjusted under 35 U.S.C. 154(b) by 0 days. days.

(21) Appl. No.: 15/394,763

(22) Filed: Dec. 29, 2016

(65) Prior Publication Data

US 2017/0105465 A1 Apr. 20, 2017

Related U.S. Application Data

(60) Provisional application No. 62/272,636, filed on Dec. 29, 2015.

(51) Int. Cl.

| | |
|---|---|
| ***G06F 3/038*** | (2013.01) |
| ***A41D 27/08*** | (2006.01) |
| ***H05B 37/02*** | (2006.01) |
| ***F21V 33/00*** | (2006.01) |
| ***H05B 33/08*** | (2006.01) |
| ***F21L 4/08*** | (2006.01) |
| ***G09F 9/35*** | (2006.01) |
| ***G09F 23/00*** | (2006.01) |
| ***A41D 25/00*** | (2006.01) |
| ***F21S 10/02*** | (2006.01) |
| ***G09F 9/33*** | (2006.01) |
| ***G09F 21/02*** | (2006.01) |
| ***G09F 27/00*** | (2006.01) |

(Continued)

(52) U.S. Cl.
CPC ........... *A41D 27/085* (2013.01); *A41D 25/00* (2013.01); *F21L 4/08* (2013.01); *F21S 10/02* (2013.01); *F21V 33/0008* (2013.01); *G09F 9/33* (2013.01); *G09F 9/35* (2013.01); *G09F 21/02* (2013.01); *G09F 23/00* (2013.01); *G09F 27/00* (2013.01); *H05B 33/0857* (2013.01); *H05B 37/0272* (2013.01); *F21W 2121/06* (2013.01); *F21Y 2115/10* (2016.08); *G09F 2021/023* (2013.01)

(58) Field of Classification Search
CPC ..... G06T 11/001; G06T 15/04; G06T 15/005; G06T 1/60; G06T 17/005; G06T 17/10; G06T 11/203; G06T 19/00; G06F 9/4443; G06F 3/14; G06F 3/016; G06F 3/011; G06F 3/038; G06F 3/03543; G06F 3/0338; G09G 5/363; A47G 27/0275
See application file for complete search history.

(56) References Cited

U.S. PATENT DOCUMENTS 9,824,622 B1 * 11/2017 Said .................... G09G 3/2092
2007/0285385 A1 * 12/2007 Albert .................... G06F 3/147 345/107

* cited by examiner

*Primary Examiner* — Minh D A

(57) ABSTRACT

A necktie with integrated, individually addressable, multi-colored light emitting diode (LED) modules arranged in a rectangular matrix format. These LED modules are connected together and controlled by means of an onboard microcontroller. Functionality is included in order to facilitate the installation of custom light patterns by the user after manufacture. The device includes an onboard wireless communication module in order to facilitate communication with an external control interface, such as an application on a smartphone, so the light patterns displayed by the LEDs may be modified based on user input.

19 Claims, 11 Drawing Sheets

(51) Int. Cl.

| | |
|---|---|
| *F21Y 115/10* | (2016.01) |
| *F21W 121/06* | (2006.01) |

WIRELESSLY CONTROLLED LED ELECTRONIC NECKTIE

CROSS-REFERENCE TO RELATED APPLICATIONS

This application claims the benefit of provisional patent application No. 62/272,636, filed Dec. 29, 2015 by the present inventor.

FIELD OF THE INVENTION

This invention relates to the field of wearable electronics. More specifically, the invention comprises a necktie with a plurality of light emitting diodes (LED), a wireless communication module, and other support hardware and methods.

BACKGROUND

In more recent times, an increasing number of articles of clothing have various forms of electronic functionality installed. These articles may sometimes be referred to as "wearables." Such articles of clothing, more specifically neckties, can be outfitted with a plurality of lighted elements, such as light emitting diodes, typically arranged in a graphic pattern in order to produce a sensational visual effect to spectators. These neckties, however, are lacking in several areas.

The first of these is that the lighted elements on such a necktie are not arranged in a manner in which a wide variety of light patterns can be displayed. For example, lighted elements arranged in the outline of a square are only able to display light patterns in the shape of a square or portions thereof; a light pattern in the shape of a triangle would not be able to be expressed. Thus, current devices are limited in that the range of possible light patterns is quite narrow due to the lack of flexibility given by limiting arrangements of the lighted elements.

Such neckties are also lacking in that light patterns displayed via the lighted elements cannot be customized or modified after the device has been manufactured. The user of such a device is limited only to the one or more light patterns that are already pre-installed; no interface exists for the user to install auxiliary patterns.

These neckties also do not have the capability to be controlled or have their functionality modified by the user from an external controller, such as a smartphone. The addition of user interactivity to such a device would vastly increase the range of light patterns available if they can be responsive to user input.

SUMMARY OF THE INVENTION

The preferred embodiment of the invention comprises a standard fabric necktie supplemented with LED modules capable of emission of any of color of light, necessary electronic support hardware, a wireless communication module, and necessary code to govern the function of all electronic components. The necktie communicates with similarly capable external controllers via the wireless module in order to modify electronic functions of the necktie, such as what is displayed with the LEDs.

The necktie includes LED modules arranged in a rectangular matrix configuration and chained together to provide power and data connections. A layer of mesh or other fabric is placed between the LED modules and the front of the tie in order to eliminate discoloration of the fabric resulting from the heat generated from the LEDs during normal operation. A battery and supporting hardware, such as a battery charger and voltage converter, are included to provide a power source for the components. A microcontroller is included to control the functions of the components, including controlling the LEDs. The functions of the necktie can either be modified by an onboard push button or with the onboard wireless communication module. The necktie is powered on and off using a slide switch.

The program that runs on the microcontroller begins by initializing necessary modules, and otherwise preparing to run the main code. All functions run in an infinite loop, which begins by checking if anything should be modified. Any such information comes from either the onboard button or from data received by the wireless module. The program then runs some unique method that governs what is displayed using the LEDs. The program may also include a function to bind the necktie to a certain external controller, so that unauthorized commands may not be received from unapproved devices.

BRIEF DESCRIPTIONS OF THE DRAWINGS

DESCRIPTION OF THE PREFERRED EMBODIMENTS

Figure 1:
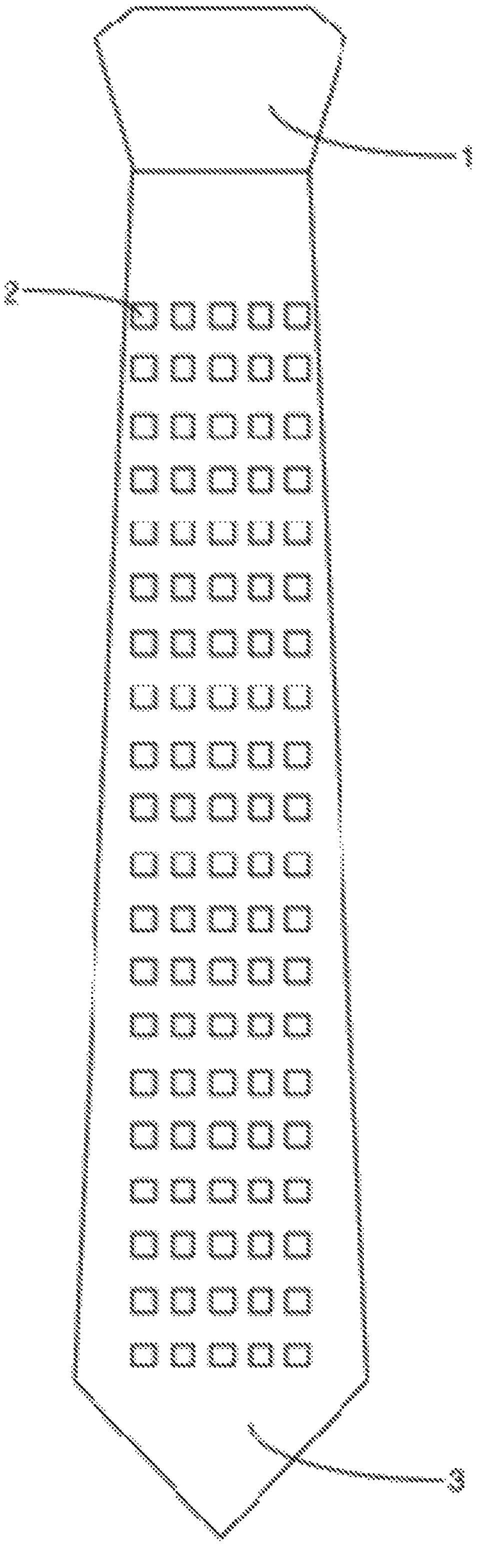
FIG. 1 is a front-side cutaway view of the tie, showing the arrangement and placement of the LEDs.

Referring to FIG. 1, which shows the location, placement, and arrangement of the LEDs that are inside the necktie or possibly outside the necktie, the diagram features the main body of the necktie (3) and the knot of the necktie (1) . The LEDs (2) are set up in a rectangular matrix configuration to provide the greatest flexibility regarding what graphical depictions can displayed using the LEDs, as this type of configuration is mostly commonly used in other electronic displays. Some embodiments may not feature this specific configuration of LEDs and may be placed in other patterns in order to achieve a distinct effect not producible by a matrix configuration. The LEDs themselves have the capability of emitting any color of light and are individually addressable and such that an electronic controller may change the color and/or brightness of each LED to achieve a specific visual effect. The LEDs are chained together with a minimum of three connections between any two of them: a power supply line, a ground line, and at least one data line in which color/brightness data is transmitted.

Figure 2:
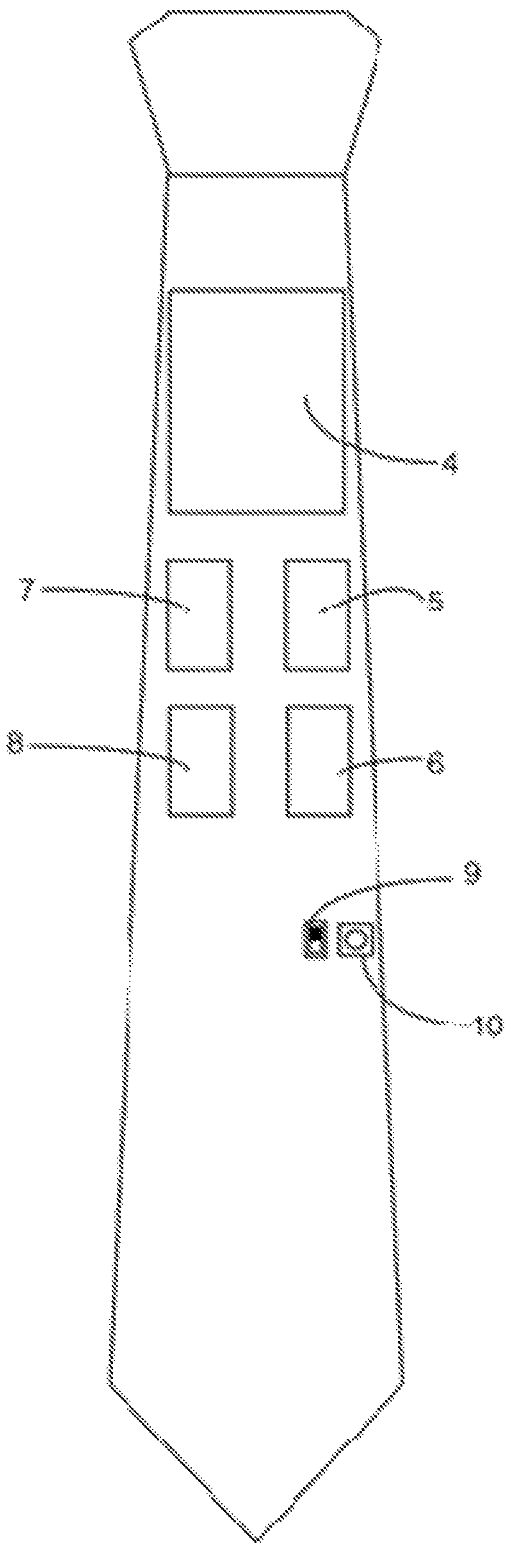
FIG. 2 is a rear-side cutaway view of the tie, showing the relative locations of the internal electronic components.

Referring to FIG. 2, which shows a rear-side cutaway view of the internal electronic components located in the necktie, all of the electronic components are located as high up as possible such that the center of mass is kept high. This mitigates the effect of the necktie unnecessarily and uncontrollably swaying while being worn as a result of a low center of mass. The necktie features a rechargeable lithium-ion polymer battery as the power source for all electronic components. Some embodiments may use other types of power sources, including, but not limited to, nickel cadmium batteries, nickel metal hydride batteries, lead-acid batteries, or various non-rechargeable batteries that must be disposed and replaced upon full discharge. The battery may also feature an integrated protection circuit to protect against excessive current/voltage discharge. A lithium-ion polymer charging circuit (5) is included to provide a safe, controlled charge environment for the battery. As some embodiments may use a different power source, this may be substituted for a charge circuit for a different type of battery or removed completely if using non-rechargeable batteries. A DC-to-DC step-up converter (7) is used to increase the native output voltage from the battery to the operating voltage required by the electronic components to function properly, preferably 5V. Some embodiments may use a power source that may natively supply an output voltage greater than the voltage required for the electronic components to function, in which case the step-up converter is substituted for a DC-to-DC step-down converter to reduce the voltage to what is required. All electronic functions of the necktie are governed by the onboard microcontroller (6). Communication with external controllers is achieved using a Bluetooth Low Energy module (8). Some embodiments may use a different wireless protocol module to communicate, including, but not limited to, a WiFi module, infrared control module, cellular GSM module, mobile satellite communication module, or other radio-based communication module. Turning the internal electronic components on and off is achieved by a slide switch (9) that regulates whether the power supply is connected to the internal electronic components. Some embodiments may use a different type of toggle switch to regulate the power supply connection. Modifying program functions of the microcontroller is achieved by a push button(10). All of the aforementioned components may exist as their own independent module, or they may be consolidated onto one or more printed circuit boards.

Figure 3:
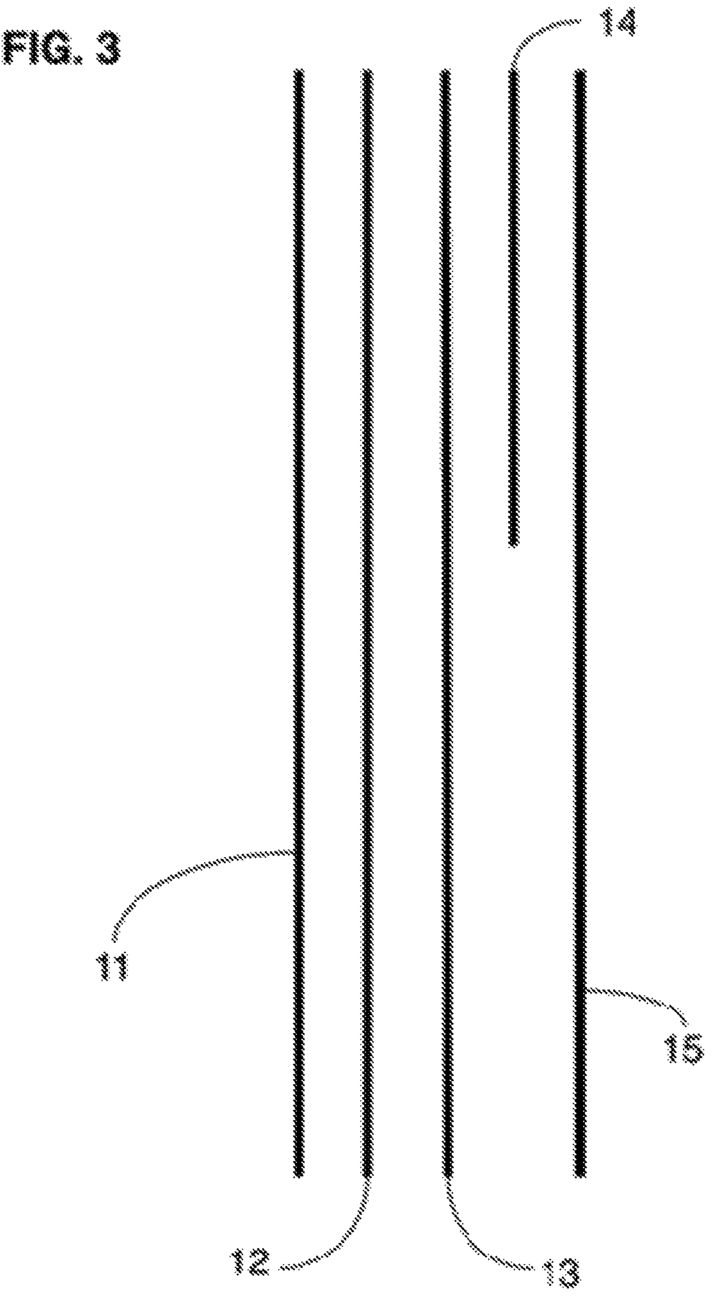
FIG. 3 is a side cutaway view of the different layers that compose the tie.

Referring to FIG. 3, which shows a side cutaway view of the necktie featuring the different layers of components that constitute it, the primary layer of the necktie is the front fabric layer (11), composed of either manmade or natural fibers, including, but not limited to, polyester, cotton, silk, nylon, linen, wool, or cashmere. Directly behind this is a layer of mesh (12), typically low density. The mesh is located in between the front fabric layer and the LED modules so that the heat generated by the LEDs from normal operation dissipates into the mesh rather than directly into the front fabric layer, causing discoloration of the fabric. The mesh layer also serves a purpose of providing a barrier between the LEDs and the front fabric so that the outline/shape of the LEDs does not protrude conspicuously from the front fabric. Mesh is used instead of regular fabric due to its inherent properties of allowing light, in this instance from the LEDs, to pass through relatively unobstructed. Most manufactured neckties have a thin front fabric layer, necessitating the mesh; however, some embodiments may use a thicker front fabric layer so that the effects of an additional mesh layer are negligible. Behind the mesh layer are the LED modules (13), as well as the accompanying circuitry that allows them to connect to each other. The LEDs may being placed on strips of flexible circuit boards for simplified connections to each other and the internal electronic components, or in some embodiments, may exist as individual modules and connected with wires. Behind the layer of LEDs are the internal electronic components (14). Behind this is the back fabric layer (15) of the necktie. All of the aforementioned layers may be bound together with adhesive or otherwise sewn together when appropriate.

Figure 4:
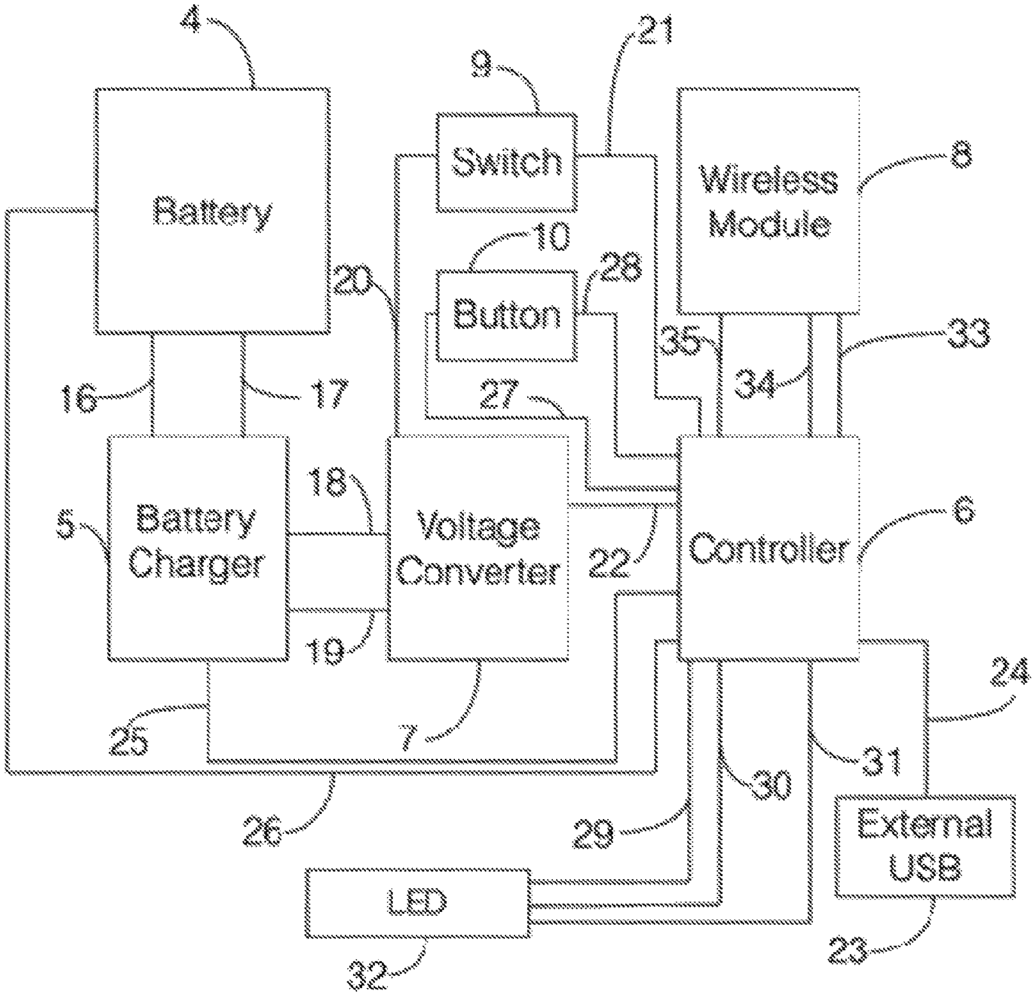
FIG. 4 is a wiring schematic of the internal electronic components.

Referring to FIG. 4, which is a wiring schematic of the internal electronic components of the necktie, the battery (4) functions as a power source for all the electronics. The battery is connected to the battery charging module (5) with two connections, a positive power line (16) and a ground line (17). From the battery charging module, power is fed to the DC-DC step-up converter (7) via a positive power line (18) and a ground wire (19). In some embodiments which use non-rechargeable batteries as the power source, the battery charging module is not necessary and thus can be removed. In this case, the battery connects directly to the DC-DC step-up converter via a positive power line and a ground line. In some embodiments where the native output voltage of the power source is greater than the operating voltage of the electronic components, the DC-DC step-up converter is replaced with a DC-DC step-down converter to regulate the voltage down to the operating voltage of the electronic components. From the voltage converter, a positive power line (20) connects to a slide switch (9), or another toggle switch in some embodiments. The switch continues the circuit with a positive power line (21) to the microcontroller (6). The purpose of the switch is to regulate whether or not power is applied to the microcontroller, which hosts electricity for other components. When the switch is set to a closed position, electricity passes through into the other components and returns through a ground line (22) from the microcontroller to the voltage converter. When the switch is open, no electricity is able to flow to the other electronic components. The microcontroller features a USB interface in order to provide electricity for charging the battery as well as modifying program data on the microcontroller. An external USB host (23) connects via a standard USB cable (24). In some embodiments, a different type of serial communication protocol may be used, including, but not limited to, RS-232, RS-422, RS-485, I2C, or SPI. A positive power line (25) is connected from the microcontroller to the battery charging module, such that when an external power source is connected to the microcontroller, current can flow to the module and subsequently charge the battery. A positive power line (26) is connected directly from the battery to the microcontroller, without passing through the voltage converter. This allows the microcontroller to monitor the voltage output from the battery at any point in time and calculate a battery charge level. A positive power line (27) connects the microcontroller to a push button (10), which then returns to the microcontroller with another power line (28). When the button is actuated, the circuit inside the button closes and allows electricity to flow through, which the microcontroller then detects and thus can modify a function in the program. A positive power line (29), ground line (30), and data line (31) are connected from the microcontroller to the power input, ground output, and data input of the first LED in the matrix (32), which is subsequently shared with the other LEDs via additional lines connected in parallel. A wireless module (8) is connected to the microcontroller with a positive power line (33), a ground line (34), and at least one data line (35), depending on the communication protocol used by the wireless module. All of the aforementioned connections may be made using wires, or via copper traces on a printed circuit board.

Figure 5:
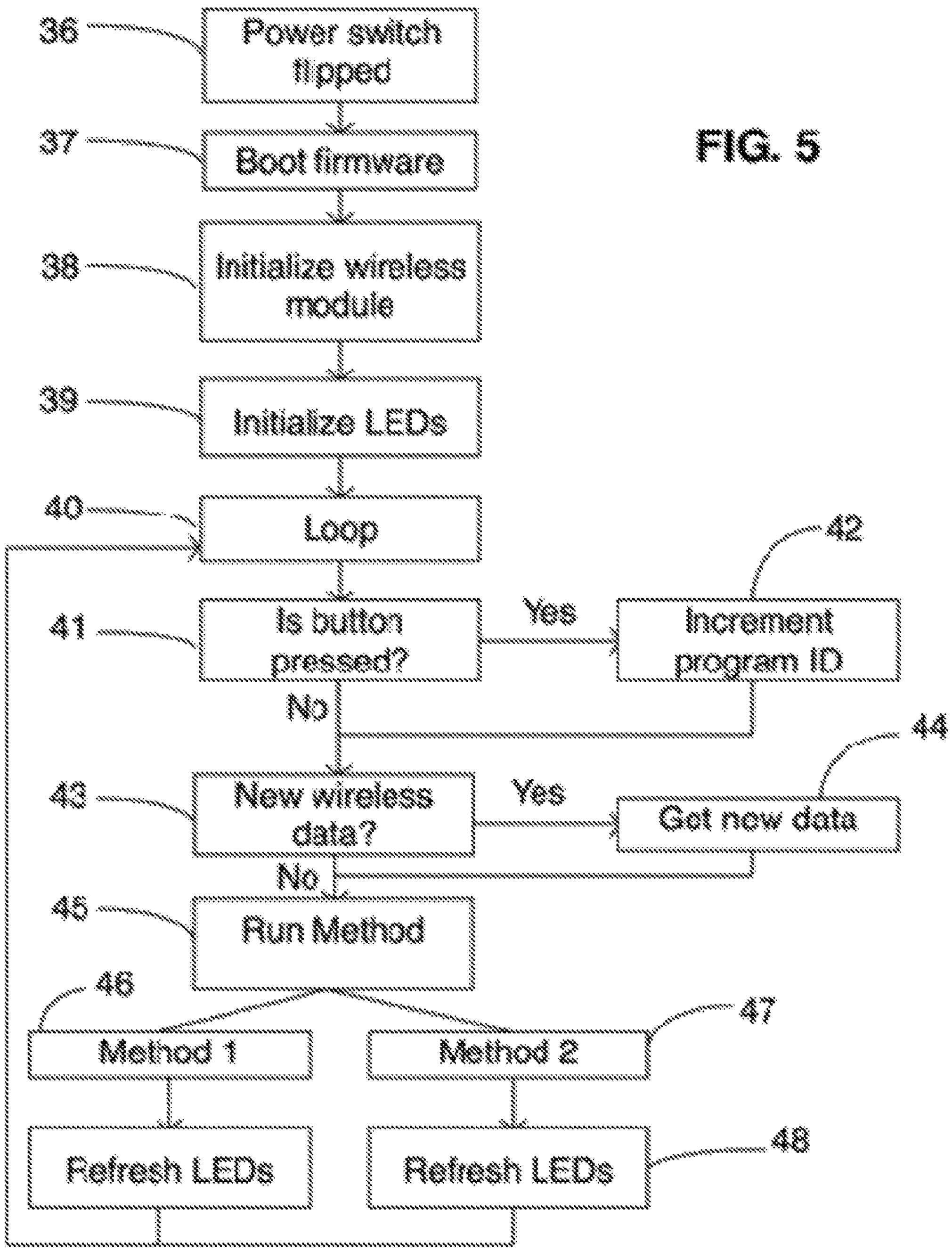
FIG. 5 is a flowchart illustrating the basic program governed by the internal electronic components.

Referring to FIG. 5, which is a flowchart demonstrating the basic program that runs on the microcontroller, the program begins when the microcontroller receives power after the slide switch is actuated and a closed circuit is made (36). The microcontroller boots the core firmware and starts running the program code (37). The first two steps in the program are initializing the wireless module (38) and initializing the LEDs (39), so that both are ready to receive program commands when appropriate commands are sent. The program then enters into a infinite loop (40) where all program functions take place. At the top of the loop, the program detects whether or not a signal is coming from the push button switch (41). If true, this corresponds to the button being actuated, and subsequently the program increases the program ID (42), an integer counter that keeps track of what method is called to modify LED data in each cycle of the loop. Whether or not this condition is true, the program then queries the wireless module and checks if new data has been received (43). If true, the program receives the new data from the wireless module, interprets the data, and modifies the program accordingly (44). Whether or not this condition is true, the program continues and reaches the main portion of the loop. The program determines, based on the value of the program ID, which method to run (45), each containing code to update the LEDs in a unique way. For example, if the program ID=1, then method 1 (46) would be called. If program ID=2, then method 2 (47) would be called, and so forth. The new data to be displayed is pushed to the LEDs (48). The loop then resets.

Figure 6:
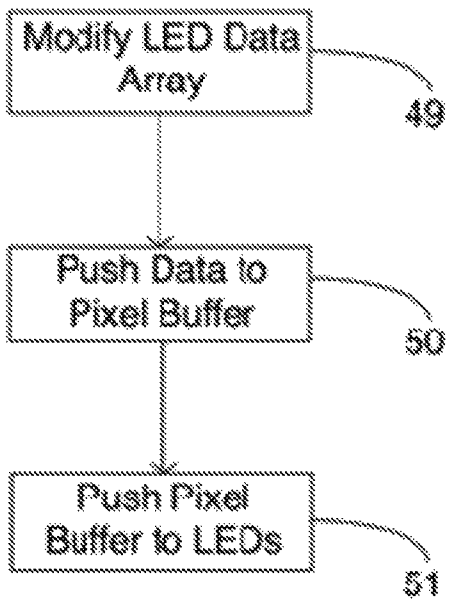
FIG. 6 is a flowchart illustrating the process of updating the LEDs.

Referring to FIG. 6, which is a flowchart demonstrating the process of pushing new or modified data to the LEDs, the process begins by modifying the data array (49) that contains information about LED color data. The array can be a multidimensional array that consists of a plurality of subarrays equal to the number of rows of LEDs in the matrix. In each of these sub-arrays are an additional plurality of arrays equal to the number of columns of LEDs in the matrix, in which three values are stored: red, green, and blue color values for each individual LED. The structure and layout of this array matches the structure and layout of the LEDs in their matrix configuration. Modification of this array involves changing the red, green, and blue color values for each LED. Once the data has been modified and the appropriate command is given, the new data is placed one piece at a time into a temporary buffer (50), which is then pushed to the LEDs (51).

Figure 7:
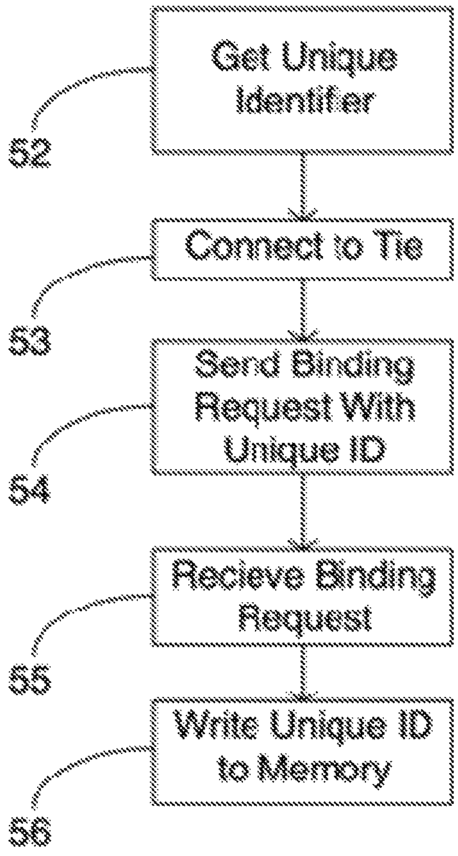
FIG. 7 is a flowchart illustrating the process of exchanging data between the tie and an external device to "bind" the two together such as to eliminate unauthorized control by the external device.

Referring to FIG. 7, which is a flowchart demonstrating the process of exchanging data with an external device such that the necktie will only have permission to connect and communicate with that specific device for the purpose of eliminating unauthorized control of the necktie, the external device, with the same wireless capabilities as the necktie, attains a unique identifier (52), either hardcoded or obtained from a central server. The external device then connects to the necktie (53) and wirelessly transmits this unique identifier in a formatted binding request. The necktie receives this request (55) and writes the unique identifier to memory (56).

Figure 8:
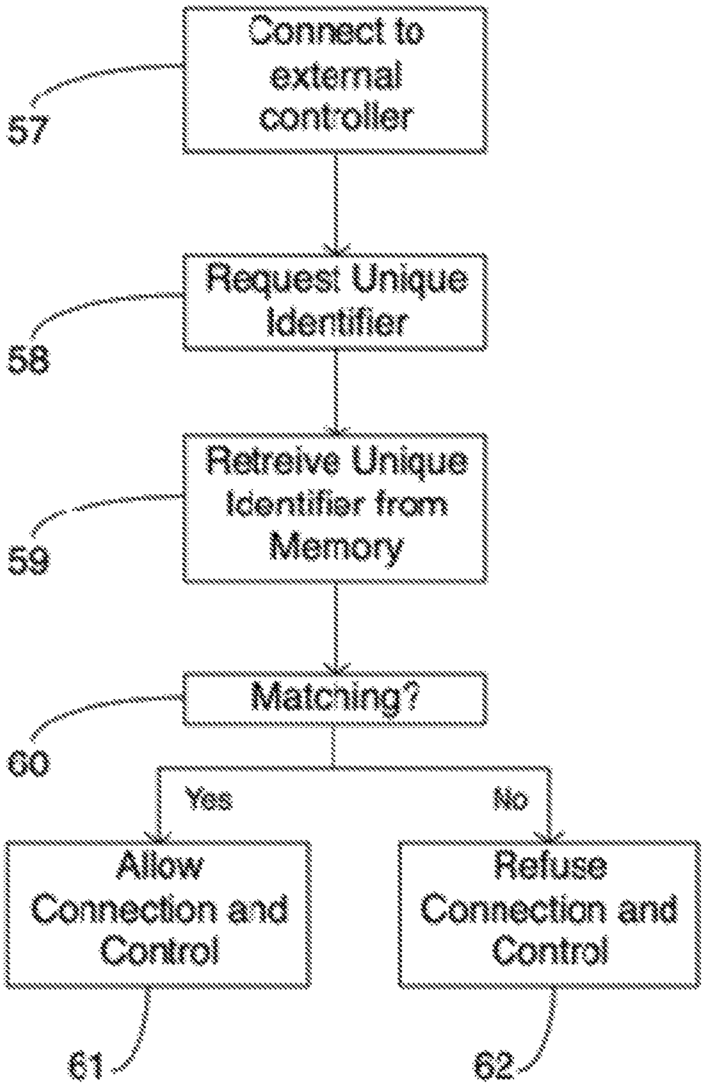
FIG. 8 is a flowchart illustrating the process of verifying whether an external device is allowed to connect and control the functions of the internal electronic components.

Referring to FIG. 8, which is a flowchart demonstrating the process of verifying if an external wireless device has permission to connect to and communicate with the necktie, the wireless external device connects to the necktie (57), which requests the unique identifier from the external device (58). The necktie then retrieves the unique identifier that was written to memory (59) when the initial binding request was processed from the authorized device. The two identifiers are compared (60) and appropriate action is taken based on the result of the comparison. If the identifiers match, the external device is allowed to communicate and control functions of the internal electronic components (61). If the identifiers do not match, the necktie refuses the connection and disconnects the external device (62), rendering it unable to communicate with and control functions of the necktie.

Figure 9:
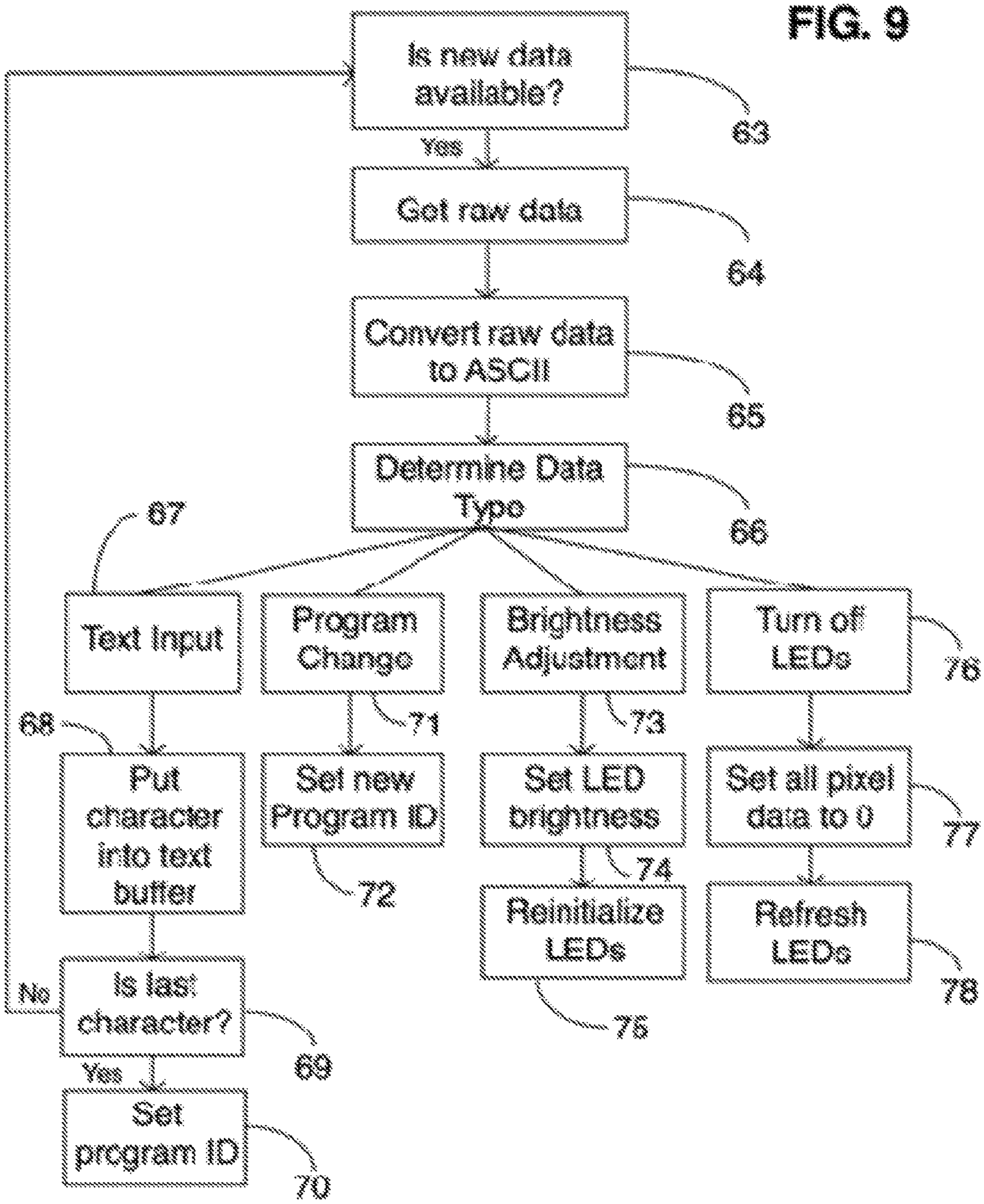
FIG. 9 is a flowchart illustrating the process of receiving new data from the wireless module and interpreting the data to modify the function of the internal electronic components accordingly.

Referring to FIG. 9, which is a flowchart demonstrating the process of receiving new data from the wireless module, interpreting the data, and modifying program functions accordingly, the program first checks if the wireless module has received new data (63). If this is true, the program retrieves the new data (64) in its raw format, such as binary or hexadecimal. This raw data is then converted into ASCII text (65), a readable and parseable format. Based on the data received, the program makes a decision what function of the program should be changed according to the data (66). If the program determines the data is text (67), it follows the procedure for modifying the current state of the program to display the text received with the LEDs. The program takes each character received and puts it in a buffer that holds the text temporarily (68). After each character, the program determines if the character is the last character in the message (69). If not, the program expects more data to be received, and returns to checking if new data is available (63). If the last character is put into the buffer, the program sets the program ID (70) to what corresponds to the method that runs the text display code. If the program determines that the received data is a change to the program ID (71), the program interprets what the new program ID should be and adjusts it value (72). If the program determines that the received data is a change in brightness of the LEDs (73), the new brightness value is pushed to all of the LEDs (74). The LEDs must be reinitialized (75) such that this global brightness change can take effect. If the program determines that the received data is a command to temporarily turn all LEDs off (76), the red, green, and blue color values of each LED are set to 0 (77), resulting in no light being emitted from the LEDs. This new data is then pushed to each LED (78).

Figure 10:
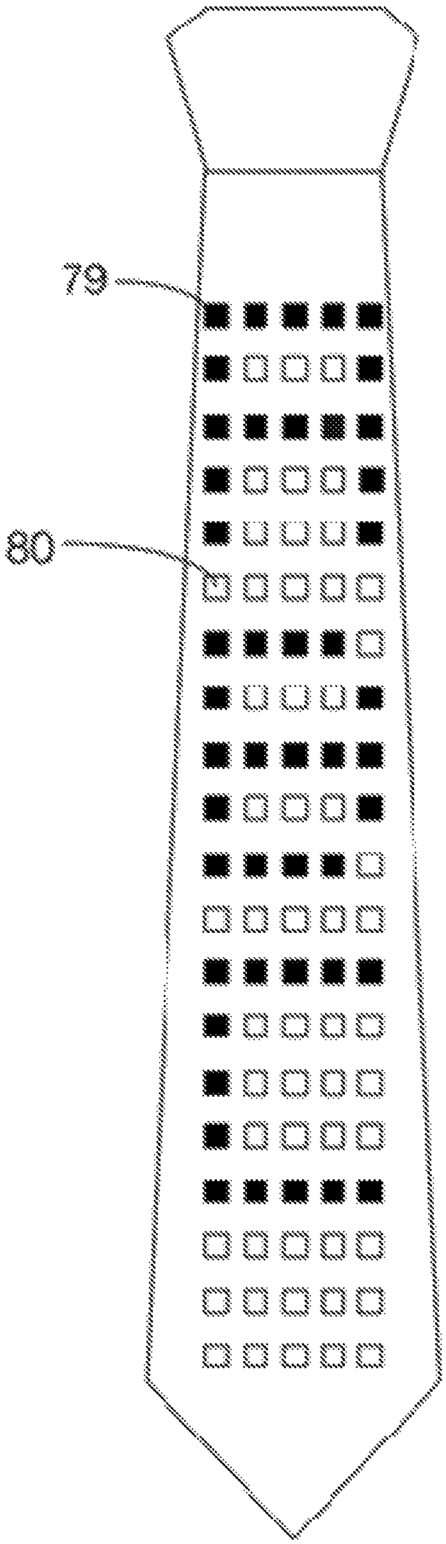
FIG. 10 is a demonstration of the text display function, showing the letters "ABC" in a dot matrix format with illuminated and non-illuminated LEDs.

Referring to FIG. 10, which shows a possible text display implementation of the necktie, the necktie uses illuminated LEDs (79) and non-illuminated LEDs (80) in order to depict a graphic representation of characters of text to convey a message to those viewing the necktie. This embodiment uses a five pixel by five pixel area to display a character, with one row of LEDs below the character being non-illuminated in order to provide character spacing for increased legibility. Some embodiments may use a higher LED density configuration as to increase the legibility of the characters from a closer distance. The microcontroller may use a software process in order to continuously update and shift the characters displayed and create a scrolling visual effect to display more characters to a viewer.

Figure 11:
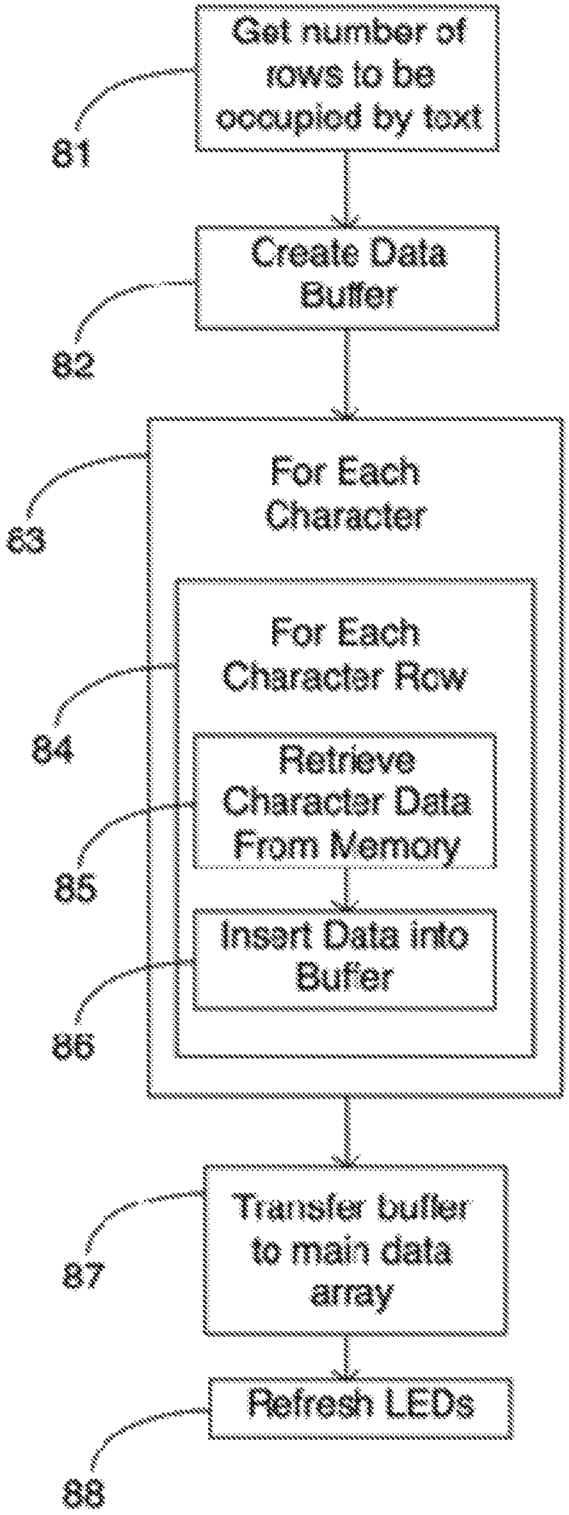
FIG. 11 is a flowchart illustrating the process of displaying specified text characters with the LEDs.

Referring to FIG. 11, which is a flowchart demonstrating the process of processing text such that it can be graphically depicted using the LEDs, after receiving text either from the wireless module or retrieving it from memory, the overall number of rows of LEDs that must be used to display all the characters of text is calculated (81). Using this number to govern the size, a temporary buffer is created to hold the LED data (82). For each character of text (83), there are a certain number of rows that are needed to display that character. For each row of a character (84), there is data that holds information about which LEDs are needed to be illuminated. The data is typically stored on onboard memory, which is retrieved (85) when it is needed. This data is transferred to the pre created buffer (86). One row of of empty data is inserted after all the data for the rows of each character in order to provide character spacing, increasing legibility of the text. After all character data has been placed into the buffer, the buffer is transferred to the main LED data array (87). Because the main array is a fixed size smaller than the buffer, only a certain number of rows can be transferred from the buffer. Each time this method is run, the starting location in the buffer where the data is taken shifts down by one row. The LEDs are then refreshed to display the new data (88). This allows more characters to be shown than what can otherwise fit on the matrix of LEDs.

I claim:

1. An article of clothing with integrated LED modules arranged in a format capable of depicting a wide range of symbols and light patterns comprising of:

a. An electronic controller to govern the illumination of the LED modules;

b. An integrated battery or a module capable of holding externally provided batteries c. A module capable of charging the battery;

d. A port to allow connection of a cable in order to provide a power source to charge the battery as well as reprogram the controller;

e. A voltage conversion module to convert the native output voltage of the battery to the operating voltage of the electronic components;

f. A wireless communication module;

g. A switch capable of powering the device on/off, and h. A push button in order to modify functionality of the electronic components.

2. An article of clothing as recited in claim 1, wherein the article of clothing is a necktie.

3. A necktie with integrated LED modules as recited in claim 2, wherein the LED modules are individually addressable and configurable and are capable of emitting any color of light.

4. A necktie with integrated LED modules as recited in claim 3, wherein the LED modules are used to display a visually appealing light pattern.

5. A necktie with integrated LED modules as recited in claim 3, wherein the LED modules are used to display a graphic representation of an object.

6. A necktie with integrated LED modules as recited in claim 5, wherein the LED modules are used to display characters of text to convey a message.

7. A necktie with integrated LED modules as recited in claim 2, wherein the electronic controller has pre programmed light patterns installed onto persistent memory.

8. A necktie with integrated LED modules as recited in claim 7, wherein the electronic controller has the ability to be supplemented with light patterns installed by the user.

9. A necktie with integrated LED modules as recited in claim 2, wherein the wireless communication module has the ability to connect and transfer data with a similarly capable external controller.

10. A similarly capable external controller as recited in claim 9, wherein the external controller is a mobile, handheld device.

11. A mobile, handheld device as recited in claim 10, wherein the device has an application installed to facilitate communication with the wireless communication module of the necktie.

12. An installed application as recited in claim 11, wherein the application has features for the user to select what functionality of the necktie they wish to change.

13. An installed application as recited in claim 12, wherein the application allows to change the light pattern/mode shown with the LED modules.

14. An installed application as recited in claim 12, wherein the application allows to change the overall brightness of the LED modules.

15. An installed application as recited in claim 12, wherein the application allows to quickly turn all LEDs on and off.

16. An installed application as recited in claim 12, wherein the application allows to send characters of text to be displayed with the LED modules.

17. A necktie with integrated LED modules as recited in claim 2, wherein the wireless module is used to supplement, modify, or remove any functionality of the electronic components.

18. A necktie with integrated LED modules as recited in claim 2, wherein a layer of low-density fabric is included between the LED modules and the front fabric layer of the necktie in order to dissipate heat generated from normal operation into the low-density fabric to mitigate undesirable discoloration of the front fabric layer.

19. A necktie with integrated LED modules as recited in claim 2, wherein the internal layers of components are bound together with adhesive material.

* * * * *